United States Patent [19]

Yasui et al.

[11] Patent Number: 5,140,465
[45] Date of Patent: Aug. 18, 1992

[54] AUTOMOTIVE DISPLAY APPARATUS INCLUDING A REFLECTION MEMBER MOVABLE INTO AND OUT OF A LIGHT PATH

[75] Inventors: Katsu Yasui; Masao Suzuki; Kazuhrio Itami, all of Shizuoka, Japan

[73] Assignee: Yazaki Corporation, Tokyo, Japan

[21] Appl. No.: 679,496

[22] Filed: Apr. 2, 1991

[30] Foreign Application Priority Data

Apr. 3, 1990 [JP] Japan .............................. 2-35447[U]

[51] Int. Cl.$^5$ ........................ G02B 27/14; G02B 17/06
[52] U.S. Cl. ..................................... 359/631; 359/633
[58] Field of Search .......................... 350/174; 340/705

[56] References Cited

U.S. PATENT DOCUMENTS

| | | | |
|---|---|---|---|
| 4,582,389 | 4/1986 | Wood et al. | 350/174 |
| 4,600,271 | 7/1986 | Boyer et al. | 350/174 |
| 4,831,366 | 5/1989 | Iino | 350/174 |
| 4,919,517 | 4/1990 | Jost et al. | 350/174 |
| 4,925,272 | 5/1990 | Ohshima et al. | 350/174 |
| 4,962,998 | 10/1990 | Iino | 350/174 |
| 4,967,191 | 10/1990 | Iino | 350/174 |
| 4,973,139 | 11/1990 | Weinhrauch et al. | 340/705 |

*Primary Examiner*—John W. Henry
*Attorney, Agent, or Firm*—Armstrong, Nikaido, Marmelstein, Kubovcik & Murray

[57] ABSTRACT

In one embodiment of the present invention, the automotive display apparatus has two concave mirrors arranged below the windshield in such a way that light from the display of an indicator which shows driving condition information such as car speed is reflected by one of the concave mirrors toward the other concave mirror, which then reflects the light toward the windshield that further directs it toward the driver's seat. A drive can thus see a remotely formed virtual display image within a viewing field of the windshield. The first concave mirror, which directly receives light from the indicator and reflects it toward the second concave mirror, is mounted on a plane mirror in such a manner that it can be moved into or out of a light path that extends from the indicator to the second concave mirror. When the first concave mirror is in the light path, the display image is magnified and hence the virtual display image is formed at a remote position from the driver. When the first concave mirror is moved out of the light path, the light is simply reflected by the plane mirror and not magnified so that the virtual display image is formed at a position closer to the driver than the first position. The virtual image position is changed according to the car speed. Other embodiments of the invention include mounting the automotive display apparatus on the ceiling of the vehicle.

4 Claims, 4 Drawing Sheets

AUTOMOTIVE DISPLAY APPARATUS INCLUDING A REFLECTION MEMBER MOVABLE INTO AND OUT OF A LIGHT PATH

BACKGROUND OF THE INVENTION

1. Field of the Invention

The present invention relates to an automotive display apparatus which reflects a display image of an indicator by a reflection surface located in front of the driver's seat so that a driver can see the display of information on vehicle running conditions such as car speed within a viewing field of the windshield.

2. Prior Art

The apparatus of this kind is generally called a head-up display, which is designed to reduce the shift of the driver's line of sight when the driver checks the car speed while driving. The apparatus reflects the display image of an indicator showing such information as the vehicle speed toward the driver's seat using the inner surface of the windshield to form a virtual image of the display within a viewing field of the windshield when viewed from the driver.

During high-speed driving, a driver looks far ahead. To reduce the amount of focus shift of the driver's eye when he or she checks the display, it is a conventional practice to provide a so-called remote display, in which a virtual image of the indicator display, when viewed by the driver, is formed at a location remote from and in front of the windshield.

FIG. 6 shows one example of a prior art display apparatus or a head-up display apparatus which produces the above-mentioned remote display. In the figure, reference numeral 1 represents a windshield, 2 a dashboard, 3 an indicator unit, and 4 a viewing point of a driver. This apparatus reflects a display image of the indicator unit 3 installed in the dashboard 2 onto the windshield 1 toward the driver's seat so that the driver can see, from the viewing point 4, a virtual image X of the display within a viewing field of the windshield 1.

As shown in FIG. 7, the indicator unit 3 contains an indicator 31 such as a fluorescent display tube, a plane mirror 32 and a concave mirror 33, all arranged in their specified optical positional relationship. The display image of the indicator 31 is reflected by the plane mirror 32 toward the concave mirror 33, which further reflects it toward the windshield 1.

The indicator 31 is located within the focus of the concave mirror 33, which enlarges the display image so that the distance L from the windshield 1 to the virtual image X is longer than the light path $\alpha + \beta + \gamma$ extending from the windshield 1 to the indicator 31 through the concave mirror 33 and the plane mirror 32. If the concave mirror is not used, it is impossible to secure a light path long enough to produce a satisfactory remote display by only the reflections inside the indicator unit 3 since the indicator unit 3 is installed in the dashboard 2 and thus cannot be allocated a large space. To solve this problem, the concave mirror 33 is employed to enlarge the display image and thereby form the virtual image X at a remote position.

In the above-mentioned conventional apparatus, however, the remote display is formed by a single concave mirror 33, making it necessary for the concave mirror 33 to have a large magnifying power. This results in a distorted virtual image X and also gives rise to the problem of the visual field of the concave mirror 33 being reduced, thereby narrowing the effective range of the display image that is magnified by the reflection surface of the concave mirror 33.

SUMMARY OF THE INVENTION

In an automotive display apparatus forming a head-up display which makes use of the magnifying property of a magnifying reflection member such as a concave mirror in forming a remote display, it is an object of this invention to minimize the magnifying power of the magnifying reflection member so as to reduce distortions in the remotely displayed image and thereby secure a wide visual field of the magnifying reflection member.

To achieve the above objective, an automotive display apparatus of this invention incorporates an indicator installed in a ceiling of the car cabin for displaying information on driving conditions; and a magnifying reflection member arranged below the windshield for reflecting light from the display of the indicator to a reflection surface located in front of the driver's seat which further directs the light toward the driver's seat, said magnifying reflection member having its focal length so set that the indicator lies within the focus of the magnifying reflection member so that a driver can see a magnified display image of the indicator within a viewing field of the windshield at a remote position.

Another automotive display apparatus of this invention incorporates an indicator for displaying information on driving conditions; a first magnifying reflection member arranged below the windshield for reflecting light from the display of the indicator to a reflection surface located in front of the driver's seat which further directs the light toward the driver's seat; and a second magnifying reflection member arranged below the windshield in such a way that it reflects light from the display of the indicator toward the first magnifying reflection member, said first and second magnifying reflection members having their focal lengths so set that the indicator lies within the combined focus of the first and second magnifying reflection members so that a driver can see a magnified display image of the indicator within a viewing field of the windshield at a remote position.

The working of the invention may be briefly described as follows.

In an automotive display apparatus in which an indicator is installed in the ceiling of the cabin, the indicator lies within the focus of a magnifying reflection member, so that the display image of the indicator is formed within a viewing field of the windshield at a remote position by the magnifying action of the magnifying reflection member.

Since the indicator mounted in the cabin ceiling is located at a large distance from the magnifying reflection member arranged below the windshield, the magnifying power of the magnifying reflection member can be set smaller to the extent corresponding to this distance between the indicator and the magnifying reflection member. The reduced magnifying power results in reduced distortions of the display image and a wide visual field of the magnifying reflection member.

In another automotive display apparatus equipped with a second magnifying reflection member, the indicator is located within the combined focus of the first and second magnifying reflection members, so that the display image is formed within the viewing field of the windshield at a remote position by the combined magnifying actions of the first and second magnifying reflection members.

Since the magnifying action for the remote display is given by the first and second magnifying members, the magnifying power of each member can be made smaller than when the remote display is produced by a single magnifying reflection member, thereby mitigating distortions of the display image and securing a wide visual field of these magnifying reflection members.

PREFERRED EMBODIMENTS OF THE INVENTION

Figure 1:
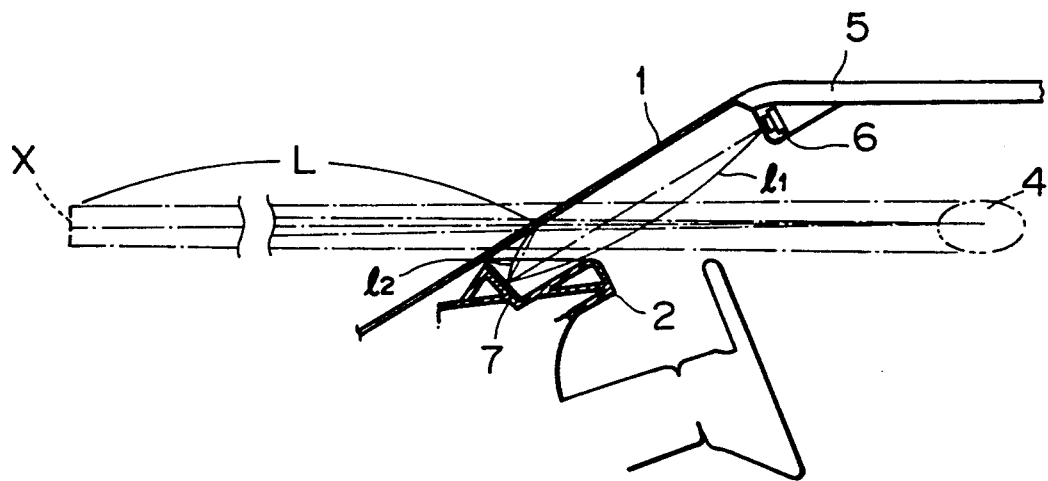
FIG. 1 is a schematic diagram showing an automotive display apparatus as a first embodiment of this invention.
Figure 6:
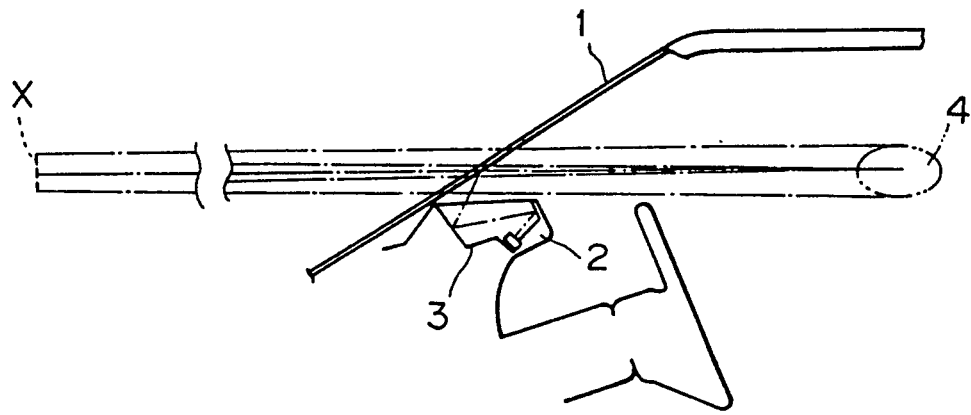
FIG. 6 is a schematic diagram showing a conventional display apparatus that forms a remote head-up display.

FIG. 1 shows an automotive display apparatus as a first embodiment of this invention. Components identical with those of FIG. 6 are given like reference numerals.

In the figure, reference numeral 5 represents a ceiling of the cabin; 6 an indicator installed in the ceiling 5 with the display surface of the indicator 6 directed toward the front of the vehicle; and 7 a concave mirror as a magnifying reflection member installed in the dashboard with the concave reflection surface directed toward the indicator 6. The display image of the indicator 6 is reflected by the concave mirror 7 toward the windshield 1, which further reflects the display image toward the driver's seat so that the driver can see, from a viewing point 4, a virtual image X of the display within a viewing field on the windshield 1.

The shape (or curvature) of the concave surface of the mirror 7 is set so that the indicator 6 lies within the focus of the concave mirror 7 (i.e. on the concave mirror side of the focal point). Because of the magnifying action of the concave mirror 7, the distance L from the windshield 1 to the virtual image X becomes longer than the light path $l_1 + l_2$ from the windshield 1 to the indicator 6, thus providing a good remote display. The indicator 6 displays information on vehicle running conditions such as car speed and may employ a VFD, LED or backlit LCD.

Now, let us compare the first embodiment mentioned above with the conventional apparatus of FIG. 6. The light path $l_1 + l_2$ from the windshield 1 to the indicator 6 in the first embodiment is longer than the light path $\alpha + \beta + \gamma$ from the windshield 1 to the indicator 31 in the conventional apparatus. Hence, the first embodiment can make the magnifying power of the concave mirror 7 smaller than that of the concave mirror 33 of the conventional apparatus and still secure an enough length L from the windshield 1 to the virtual image X for making a satisfactory remote display.

The smaller magnifying power of the concave mirror 7 of the first embodiment results in reduced distortions in the virtual display image as compared with those found in the conventional apparatus while at the same time securing a wider visual field of the concave mirror.

Figure 2:
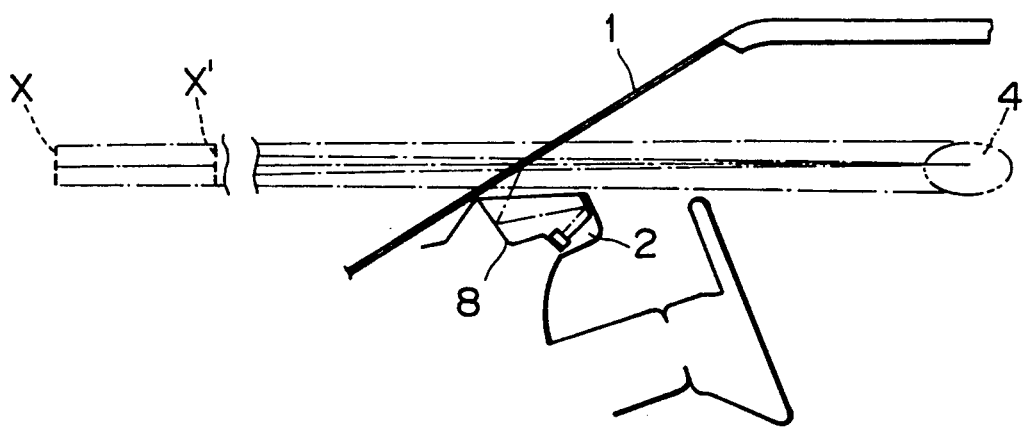
FIG. 2 is a schematic diagram showing an automotive display apparatus as a second embodiment of this invention.
Figure 3:
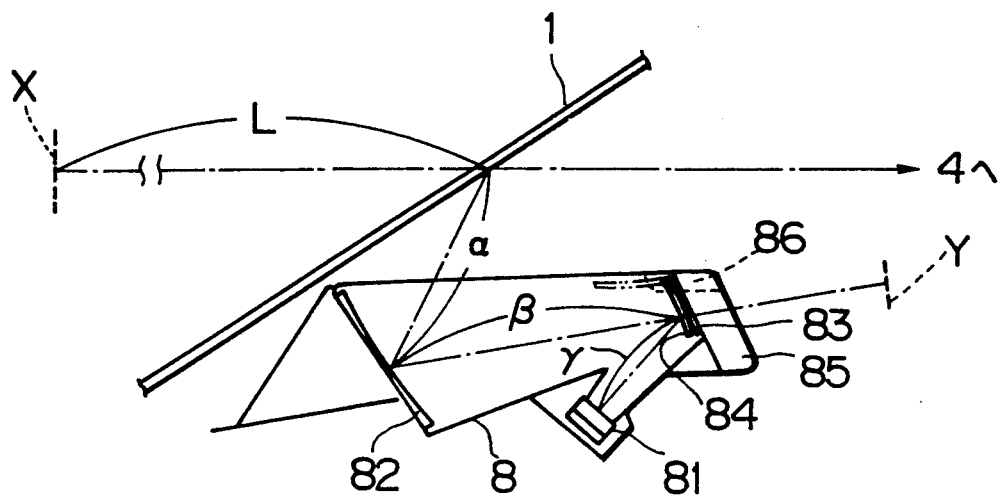
FIG. 3 is a schematic diagram showing an indicator unit employed in the second embodiment.

FIG. 2 shows an automotive display apparatus as a second embodiment of this invention. In the FIG. 8 is an indicator unit installed in the dashboard 2. As detailed in FIG. 3, the indicator unit 8 incorporates an indicator 81 showing such driving condition information as car speed, as in the first embodiment, a first concave mirror 82, a plane mirror 83, and a second concave mirror 84, all arranged in a specified optical positional relationship.

The second concave mirror 84 facing the indicator 81 has its upper end pivotally supported and coupled to an actuator 86, which is driven by a solenoid or motor (not shown) contained in the mechanical control section 85. As the actuator 86 is operated by a control section described later, the second concave mirror 84 is rotated as indicated by the arrow so that it is switched between two states—one in which the second mirror 84 is parallel to the front surface of the plane mirror 83 (state A) and one in which the mirror is swung up to the upper part of the plane mirror 83 (state B).

The second concave mirror 84 has its concave surface curvature and position determined in such a way that in the state A, the indicator 81 lies within the focus of the second concave mirror 84. The first concave mirror 82 is so shaped and positioned that the virtual image Y of the indicator 81 formed by the second concave mirror 84 comes within the focus of the first concave mirror 82.

The display image of the indicator 81 is reflected toward the first concave mirror 82 by the second concave mirror 84 or the plane mirror 83 depending on whether the second concave mirror 84 is pivoted to the state A or state B. The rays of light reflected from the second concave mirror 84 are further reflected by the first concave mirror 82 toward the windshield 1, forming the virtual image X in the state A and the virtual image X' in the state B, as shown in FIG. 2. When a driver looks ahead from the viewing point 4, he or she can recognize the virtual image of the display X or X' in the viewing field on the windshield 1.

With the second embodiment, in the state A, the combined magnifying actions of the first and second concave mirrors 82, 84 make the distance L from the windshield 1 to the virtual image X longer than the light path $\alpha + \beta + \gamma$ extending from the windshield 1 to the indicator 81 through the first and second concave mirrors 82, 84, thus providing a satisfactory remote display.

Figure 7:
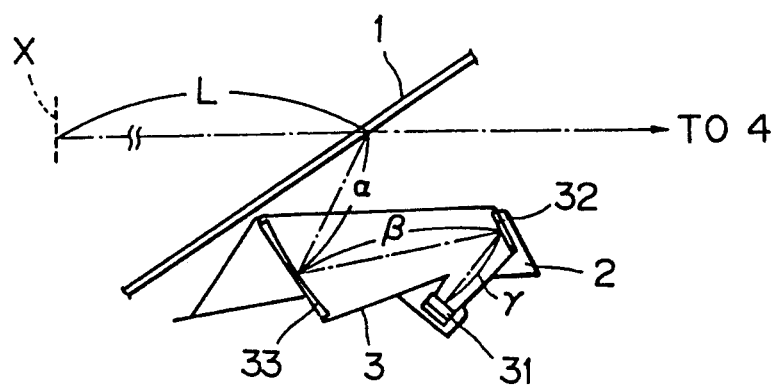
FIG. 7 is a schematic diagram showing an indicator unit used in the conventional display apparatus of FIG. 6.

In this way, since the remote display is produced through the combined magnifying actions of the two concave mirrors 82, 84, the magnifying power of each of concave mirror 82, 84 can be set smaller than that of the concave mirror 33 employed in the conventional apparatus of FIG. 7 in which the remote display is formed with a single concave mirror. In other words, the concave curvature of the first and second concave mirrors 82, 84 can be made smaller, which in turn results in reduced distortions in the virtual display image and in a wider visual field of the mirrors.

In the second embodiment, the second concave mirror position is switched between the state A and state B. This arrangement is advantageous because it permits the selection of the position and size of the virtual image according to the driving conditions. When driving at high speed on a highway, for example, the focal length of the driver's eye is long, so that the second concave mirror is switched to the stage A to produce the display image at a sufficiently remote position. While driving at low speed on a city road, the focal length of the eye is relatively short and the second concave mirror is set to the stage B to produce the display image at a not-so distant position, thus making the image easily recognizable.

Figure 4:
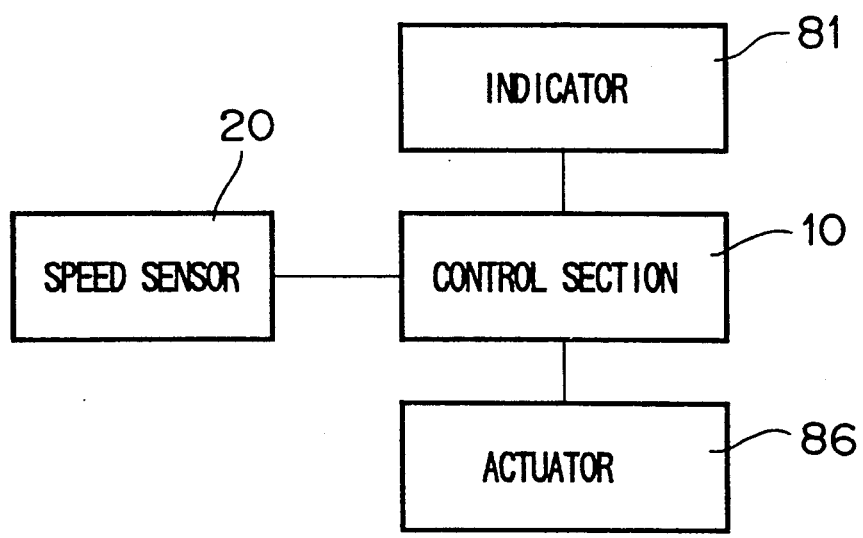
FIG. 4 is a block diagram of the second embodiment.

FIG. 4 is a block diagram of the display apparatus of the second embodiment. A control section 10 consists of a microcomputer, a drive circuit for the indicator 81, a drive circuit for the actuator 86, and an input circuit to take in a speed signal from the speed sensor 20 that represents the car speed. Under the control of the microcomputer, the control section 10 displays the car speed and selects appropriate one from the two remote display positions.

Figure 5:
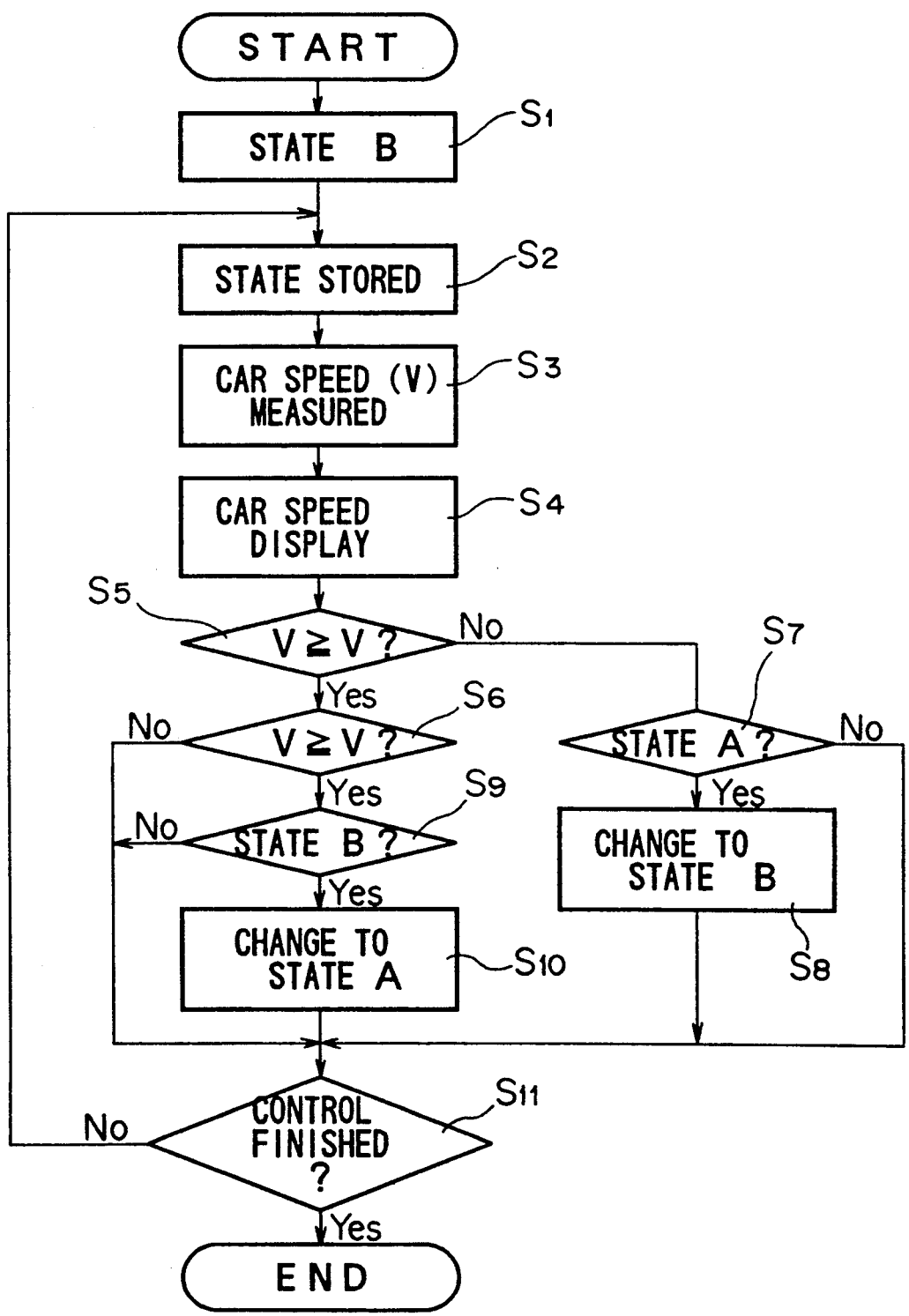
FIG. 5 is a flowchart showing one example of control sequence used in the second embodiment.

FIG. 5 shows a sequence of the above control process. The control section 10 performs control actions as follows. When the program starts upon power up, the actuator 86 is driven to move the second concave mirror to the state B. This state is stored in memory (step $S_1$, $S_2$). Next, the car speed V is measured by the speed sensor 20 and displayed on the indicator 81 (step $S_3$, $S_4$). The car speed is checked for whether it is in or out of the range between a preset first speed $V_1$ (for example 80 km/h) and a preset second speed $V_2$ (for example 81 km/h) (step $S_5$, $S_6$).

If the car speed V is found to be less than the first setting speed $V_1$ and the mirror is currently in the state A, then the actuator 86 is driven to change the second concave mirror to the state B (step $S_7$, $S_8$). If the car speed is equal to or higher than the second setting speed $V_2$ and the mirror is in the state B, the actuator 86 is driven to set the second concave mirror to the state A (step $S_9$, $S_{10}$). If the control is not finished while the car is traveling, the program returns to the step $S_2$ where it repeats the above sequence of control (step $S_{11}$).

The control mentioned above selects the distance to the remote display from the two different ones according to whether the car is traveling at a speed higher or lower than a boundary speed between the first and second setting speeds $V_1$, $V_2$. This control also prevents oscillation of display at around the setting speed.

While the preceding embodiments use the windshield as a reflection surface in front of the driver's seat, it is also possible to install a half-mirror on the dashboard and use it as the reflection surface. The concave mirror employed as a magnifying and reflection member in the above embodiments may be replaced with a hologram which has a similar function.

The construction and advantages of this invention may be summarized as follows.

In the automotive display apparatus of the invention, a head-up display is obtained by producing a virtual image within a viewing field on the windshield and the virtual image is formed at a remote position by the magnifying action of a magnifying reflection member such as a concave mirror. The indicator is installed in the ceiling of the car cabin and the focal length of the magnifying reflection member, which is arranged below the windshield, is so set that the indicator lies within the focus of the magnifying reflection member. This arrangement expands the distance between the indicator and the windshield from the one in the conventional apparatus by a large margin equal to the distance from the indicator to the magnifying reflection member. The added length therefore allows the magnifying power of the member to be set correspondingly smaller for the same remote display. This in turn reduces distortions of the display image and ensures a wide visual field of the magnifying reflection member.

In the second embodiment, a head-up display is formed by producing a virtual image within the viewing field of the windshield and the virtual image is formed at a remote position by the combined magnifying actions of magnifying reflection members such as concave mirrors. The first and second magnifying reflection members are arranged so that the second member reflects the display image of the indicator toward the first magnifying reflection member, and their focuses are set so that the indicator is within the combined focus of the first and second magnifying reflection members. This permits each of the two magnifying reflection members to have a smaller magnifying power than when only one magnifying reflection member is used to produce a remote display, thereby reducing distortions of the display image and securing a wide visual field of each magnifying reflection member.

What is claimed is:

1. An automotive display apparatus comprising:
   an indicator for displaying information on driving conditions;
   a first magnifying reflection member arranged below a windshield for reflecting light from a display of said indicator to a reflection surface located in front of a driver's seat which further directs the light toward the driver's seat;
   a second magnifying reflection member arranged in a spaced relationship from said first magnifying reflection member for reflecting the light from the display of said indicator toward said first magnifying reflection member,
   said first and second magnifying reflection members having focal lengths set so that said indicator lies within a combined focus of said first and second magnifying reflection members such that a driver can see a magnified display image of said indicator within a viewing field of the windshield at a remote position; and
   a third reflection member located adjacent to one of said first and second magnifying reflection members in a substantially parallel relationship therewith and having a smaller magnifying power than that of said one of said first and second magnifying reflection members,
   wherein one of said two adjacently located reflection members which is located on an inner side to face the other spacedly arranged magnifying reflection member is movable into or out of a light path which extends from said indicator to the reflection surface so that switching said one of said two adjacently arranged reflection members between an in-the-path position and an out-of-the-path position changes a distance from the windshield to the magnified display image.

2. An automotive display apparatus as claimed in claim 1, wherein said third reflection member is located adjacent to said second magnifying reflection member.

3. An automotive display apparatus as claimed in claim 1, wherein said third reflection member is a plane mirror.

4. An automotive display apparatus as claimed in any one of the preceeding claims 1 to 3, wherein the switching of the distance to the magnified display image is performed when a vehicle speed exceeds a preset speed.

* * * * *